United States Patent
Pisacreta

(10) Patent No.: US 9,835,091 B2
(45) Date of Patent: Dec. 5, 2017

(54) MULTIPLE PIECE SHROUD FEEDTHRU ENCLOSURE

(71) Applicant: United Technologies Corporation, Hartford, CT (US)

(72) Inventor: Pellegrino J. Pisacreta, Newtown, CT (US)

(73) Assignee: United Technologies Corporation, Farmington, CT (US)

( * ) Notice: Subject to any disclaimer, the term of this patent is extended or adjusted under 35 U.S.C. 154(b) by 925 days.

(21) Appl. No.: 13/706,445

(22) Filed: Dec. 6, 2012

(65) Prior Publication Data
US 2014/0196434 A1    Jul. 17, 2014

(51) Int. Cl.
| | | |
|---|---|---|
| F02C 7/28 | (2006.01) |
| F02C 7/25 | (2006.01) |
| F16L 5/04 | (2006.01) |
| F01D 9/06 | (2006.01) |
| A62C 3/08 | (2006.01) |
| A62C 2/06 | (2006.01) |
| F16L 5/08 | (2006.01) |

(52) U.S. Cl.
CPC .............. *F02C 7/28* (2013.01); *A62C 2/06* (2013.01); *A62C 3/08* (2013.01); *F01D 9/065* (2013.01); *F02C 7/25* (2013.01); *F16L 5/04* (2013.01); *F16L 5/08* (2013.01)

(58) Field of Classification Search
CPC .. F23R 3/60; F01D 11/00; F01D 9/065; F02C 7/20; F02C 7/24; F02C 7/25; F02C 7/28; F16L 5/04; F16L 5/08; F16J 15/065; A62C 2/06; A62C 3/08
USPC ............... 60/797, 798, 799, 752, 740, 796; 277/602, 603, 600, 607, 606; 285/142.1, 285/136.1, 148.28, 137.11; 292/317
See application file for complete search history.

(56) References Cited

U.S. PATENT DOCUMENTS

| | | | | |
|---|---|---|---|---|
| 4,136,423 | A * | 1/1979 | Sterling | 24/122.6 |
| 4,483,556 | A | 11/1984 | LiVolsi | |
| 4,758,028 | A * | 7/1988 | Davies et al. | 285/189 |
| 5,301,475 | A * | 4/1994 | Stefely | A62C 2/12 137/360 |
| 5,408,740 | A * | 4/1995 | Dee | 29/887 |
| 5,421,127 | A * | 6/1995 | Stefely | A62C 2/06 137/75 |
| 5,458,343 | A * | 10/1995 | Dornfeld et al. | 277/503 |
| 7,010,889 | B1 * | 3/2006 | Renfro | 52/219 |
| 7,748,953 | B2 * | 7/2010 | Smith | 415/118 |
| 7,866,612 | B2 | 1/2011 | Doi et al. | |
| 8,157,222 | B1 | 4/2012 | Shirey et al. | |
| 8,203,074 | B2 * | 6/2012 | Goch | 174/41 |

(Continued)

*Primary Examiner* — Pascal M Bui Pho
*Assistant Examiner* — Alain Chau
(74) *Attorney, Agent, or Firm* — Carlson, Gaskey & Olds, PC

(57) ABSTRACT

A system has a surface intended to separate two chambers within the system. The surface has an aperture for allowing passage of at least one communication conduit. A shroud is positioned on the surface at the aperture, and has at least two portions defining a central opening to allow the communication conduit to pass through the aperture and shroud. The two portions of shroud have mating clamp ears in contact with each other. Securement members tighten the clamp ears against each other to provide a seal at an end of the shroud remote from the surface.

13 Claims, 3 Drawing Sheets

(56) References Cited

U.S. PATENT DOCUMENTS

| | | | |
|---|---|---|---|
| 2003/0201613 A1* | 10/2003 | Matczak | F16L 5/10 |
| | | | 277/602 |
| 2007/0114791 A1* | 5/2007 | Williams | 285/142.1 |
| 2008/0265526 A1* | 10/2008 | Cummings | 277/606 |
| 2011/0272890 A1* | 11/2011 | Selby | F01D 11/003 |
| | | | 277/345 |
| 2013/0285329 A1* | 10/2013 | Sykes | F16L 5/10 |
| | | | 277/314 |

* cited by examiner

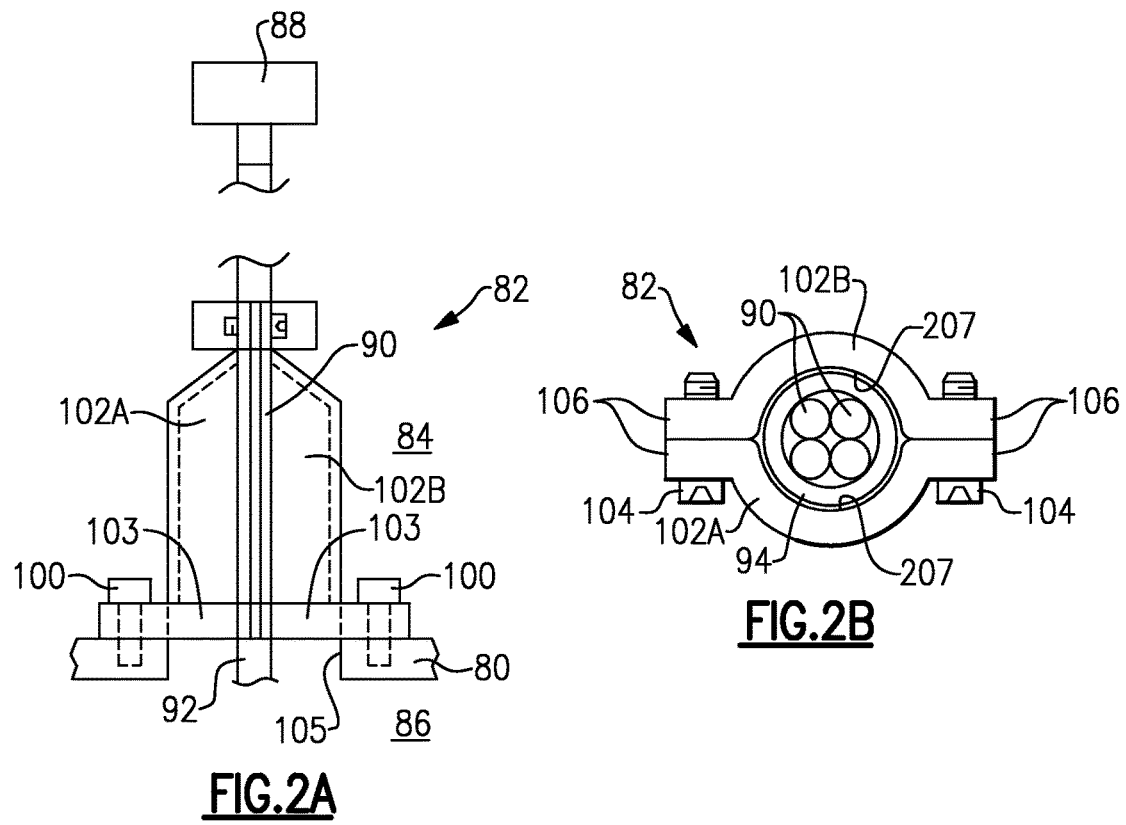
FIG.2A
FIG.2B
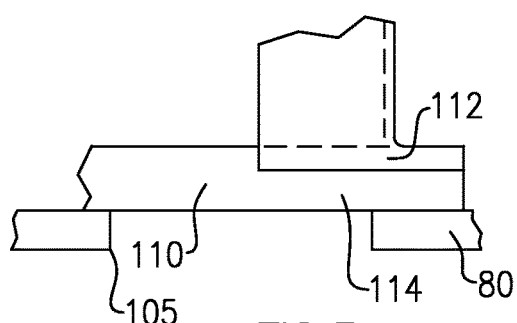
FIG.3
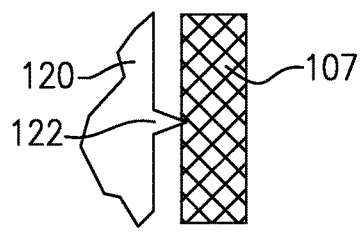
FIG.4

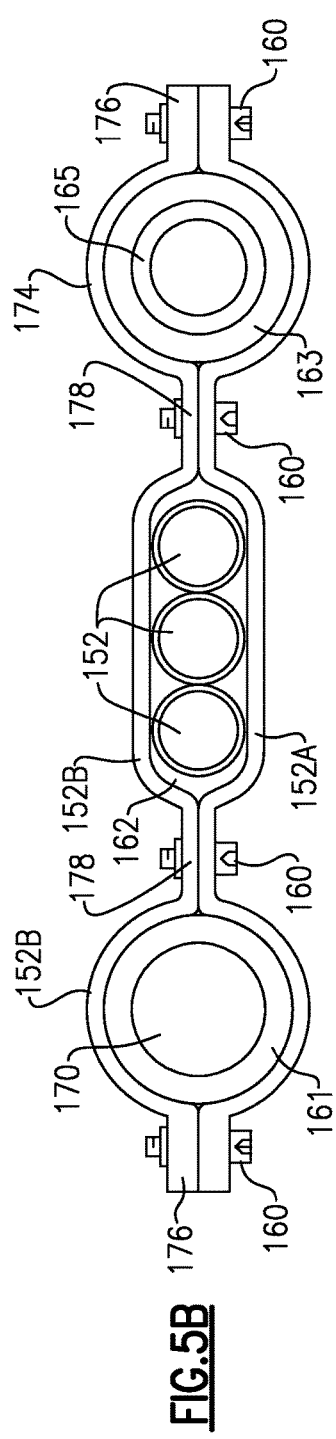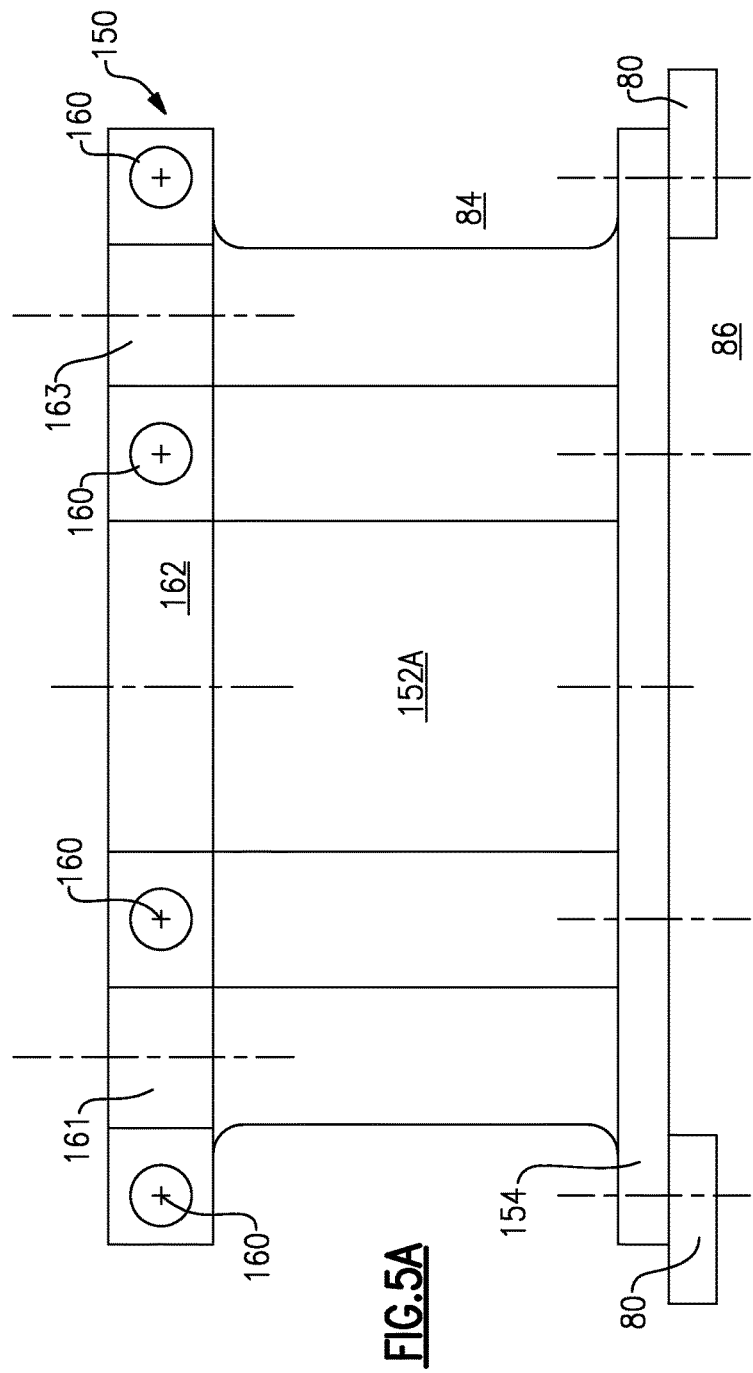
FIG.5A
FIG.5B

MULTIPLE PIECE SHROUD FEEDTHRU ENCLOSURE

BACKGROUND

This application relates to a shroud that includes at least two pieces which are clamped together to seal a feed-through location for conduits, such as wire harnesses of fluid tubes.

Communication conduits, such as those carrying electric wires, fluid tubes, or other communication media are known, and are provided in most modern mechanical systems. These conduits must sometimes pass through walls within the systems, and the apertures that they pass through must be sealed. One such application would be in a gas turbine engine.

In a gas turbine engine, a compressor compresses air and delivers it into a combustor section where it is mixed with fuel and ignited. Products of this combustion pass downstream over turbine rotors driving them to rotate. A very complex electric control controls the operation of the gas turbine engine, and several associated systems. As an example, the associated systems include fuel and lubricant pumps.

Within the gas turbine engine, there are areas which are extremely hot, and areas which may be subject to flame risk. Thus, a firewall is typically provided within the gas turbine engine to separate areas at flame risk from other areas that should be protected from the flame risk. One example would be a location where the control mentioned above is located.

Wire harnesses and fluid tubes may need to pass through this firewall. Typically, so called "feed-through" holes or apertures have allowed the communication conduits media to extend through the firewall. Grommets of various sorts have been provided to seal the aperture through which the communication conduit passes.

SUMMARY

In a featured embodiment, a system has a surface intended to separate two chambers within the system. The surface has an aperture for allowing passage of at least one communication conduit. A shroud is positioned on the surface at the aperture and has at least two portions defining a central opening to allow the communication conduit to pass through the aperture and the shroud. The two portions have mating clamp ears in contact with each other. Securement members tighten the clamp ears against each other to provide a seal at an end of the shroud remote from the surface.

In another embodiment according to the previous embodiment, the surface is a firewall for use in a gas turbine engine.

In another embodiment according to any of the previous embodiments, the communication conduit includes at least one electric wire.

In another embodiment according to any of the previous embodiments, a grounding element is received within at least one of the shroud portions. The grounding element electrically grounds the communication conduit.

In another embodiment according to any of the previous embodiments, the communication conduit includes at least a fluid tube.

In another embodiment according to any of the previous embodiments, there are two mating halves of the shroud which are secured together.

In another embodiment according to any of the previous embodiments, the shroud has a platform base receiving securement members to secure the shroud to the surface.

In another embodiment according to any of the previous embodiments, the platform base is formed of two halves formed equally in each of the two portions of the shroud.

In another embodiment according to any of the previous embodiments, the platform base includes a full cylindrical portion formed on one of the two portions of the shroud. A smaller portion is formed on another of the at least two portions of the shroud.

In another embodiment according to any of the previous embodiments, a fiberglass tape is wrapped around the communication conduit at the location of the clamp ears to provide a better seal.

In another embodiment according to any of the previous embodiments, the shroud includes a plurality of openings at the remote end. There are outer ends to the at least two portions of the shroud with the clamp ears at the outer ends. There is at least one of the plurality of opening positioned adjacent the clamp ears at the outer ends, and at least one intermediate opening intermediate the outer ones of the openings, with clamp surfaces provided between the outer ones of the opening and the at least one intermediate opening. There are securement members tightening intermediate sealing surfaces to also provide a seal at the intermediate opening.

In another featured embodiment, a gas turbine engine has a compressor, a combustor, a turbine, and a firewall separating a first chamber housing at least one of the compressor, combustor and turbine from a chamber housing a controller for the gas turbine engine. The firewall has an aperture for allowing passage of at least one communication conduit. A shroud is positioned on the firewall at the aperture. The shroud has at least two portions defining a central opening to allow the communication conduit to pass through the aperture and the shroud. The two portions of the shroud have mating clamp ears in contact with each other. Securement members tighten the clamp ears against each other to provide a seal at an end of the shroud remote from the firewall.

In another embodiment according to any of the previous embodiments, there are two mating halves of the shroud that are secured together.

In another embodiment according to any of the previous embodiments, the shroud has a platform base receiving securement tightening members to secure the shroud to the firewall.

In another embodiment according to any of the previous embodiments, the platform base is formed of two halves formed equally in each of the two portions of the shroud.

In another embodiment according to any of the previous embodiments, the platform base includes a full cylindrical portion formed on one of the two portions of the shroud. A smaller portion is formed on another of the at least two portions of the shroud.

In another embodiment according to any of the previous embodiments, fiberglass tape is wrapped around the communication conduit at the location of the clamp ears to provide a better seal.

In another embodiment according to any of the previous embodiments, the communication conduit is an electric wire. A grounding element is received within at least one of the shroud portions. The grounding element electrically grounds the electric wire.

In another embodiment according to any of the previous embodiments, the shroud includes a plurality of openings at the remote end. There are outer ends to the at least two portions of the shroud with the clamp ears at the outer ends. At least one of the plurality of openings is positioned adjacent the clamp ears at the outer ends, and at least one intermediate opening intermediate the outer ones of the openings. Clamp surfaces are provided between the outer ones of the opening and the at least one intermediate opening. Securement members tighten intermediate sealing surfaces to also provide a seal at the intermediate opening.

These and other features of this application may be best understood from the following specification and drawings, the following of which is a brief description.

BRIEF DESCRIPTION OF THE DRAWINGS

FIG. 2A shows a first embodiment shroud.
FIG. 2B is a cross-sectional view through the FIG. 2A shroud.
FIG. 3 shows an optional feature.
FIG. 4 shows another optional feature.
FIG. 5A shows a second embodiment.
FIG. 5B is a cross-sectional view through the second embodiment.

DETAILED DESCRIPTION

Figure 1:
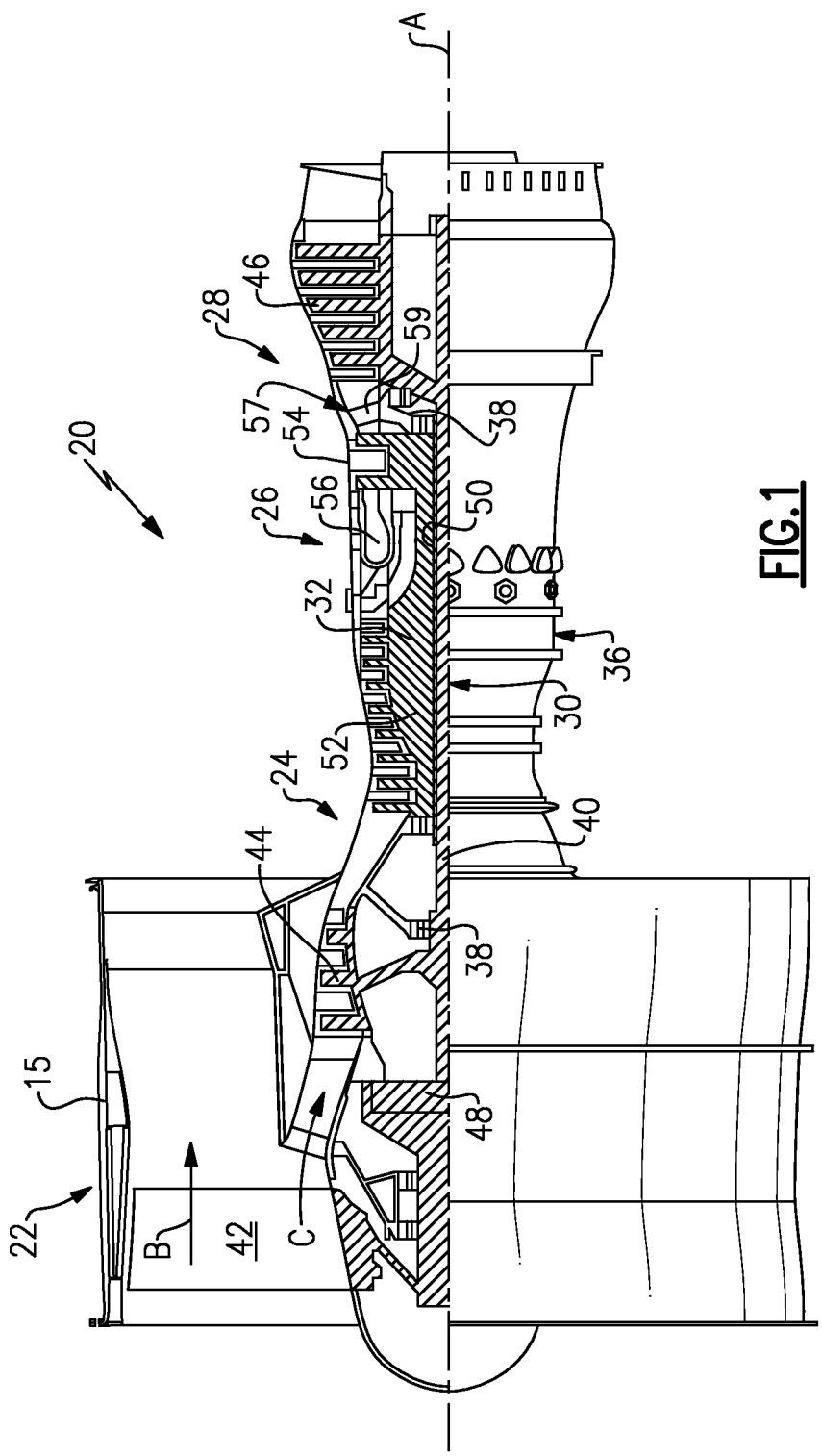
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B in a bypass duct defined within a nacelle 15, while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

FIG. 2A shows a way to communicate conduits such as may include wire harnesses or fluid tubes within a gas turbine engine such as the gas turbine engine 20 of FIG. 1. As shown, a firewall 80 may be included within the gas turbine engine at a location to separate one chamber 86 from another chamber 84. The chamber 86 may be in the vicinity of the compressor section, as an example, and may have some flame risk. A controller 88, which may be a FADEC (Full Authority Digital Engine Control) is positioned in the chamber 84. The firewall 80 serves to limit the risk of flame reaching the controller 88. As shown, a shroud 82 includes shroud halves 102A and 102B. Each shroud half 102A and 102B has a base 103.

A communication conduit 90 is shown extending from an end 92 within chamber 86 to a remote end connected to the controller 88. In this embodiment, the conduit 90 would likely be a wire harness, and can convey control signals from the control 88 to various components within the engine, and can further communicate information from the engine, such as from sensors, back to the controller 88.

As shown in FIG. 2B, clamp ears 106 are formed on each side of a central chamber 207 formed in the shroud halves 102A and 102B. The communication conduit 90 may in fact be a plurality of wires, such as in a wire harness. Fiberglass tape is shown at 94, and may be wrapped around the wires or the harness. Bolts 104 clamp the shroud halves together at the clamp ears 106, to ensure a tight seal.

With this simple arrangement, the shroud 82 allows the communication conduit to pass through an aperture 105 in the firewall 80, and a very reliable seal is provided.

FIG. 3 shows an optional feature wherein a base 110 which is connected to the firewall 80 is not formed in each of the halves 102A and 102B. Rather, one of the halves may have a portion 114 that is a full circular portion, and the other may have a smaller portion 112 to provide a portion of the base.

FIG. 4 shows another feature wherein an inner wall 120 of one of the shroud halves can be formed with a grounding element 122. The grounding element 122 may serve to ground an electrical conduit 107 passing through the shroud, such as by connecting to a braided shield on a wire harness.

FIG. 5A shows another embodiment 150. Embodiment 150 is a shroud which is again attached at base 154 to a firewall 80 to separate chambers 84 and 86. In FIG. 5A a shroud half 152A is shown. Bolts 160 are positioned between plural shroud passages 161, 162, and 163 at an end remote from firewall 80.

As can be seen in FIG. 5B, each of the passages 161, 162, and 163 may receive separate conduits 170 (wire), 152 (wires) and 165 (fluid tube). There are two shroud portions 152A and 152B. As shown, there are outer clamp ears 176 in contact, and intermediate clamp surfaces 178 in contact. Thus, when the bolts 160 are tightened, the same sealing effect as described above will be achieved for each of the passages 161, 162, and 163.

Although bolts 100, 104 and 160 are disclosed, other securement members may be used.

The shroud 150 includes outer ends to the two portions 152A and 152B with clamp ears 176 at the outer ends. Openings 161 and 163 are positioned adjacent the clamp ears 176 at the outer ends. Intermediate opening 162 is intermediate the outer openings 161 and 163. Clamp surfaces 178 are provided between the outer openings 161 and 163 and intermediate opening 162. Securement members 160 tighten the intermediate sealing surfaces to also provide a seal at the intermediate opening.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A system comprising:
a surface intended to separate two chambers within the system, said surface having an aperture for allowing passage of at least one communication conduit;
a shroud positioned on said surface at said aperture, said shroud having at least two portions defining a central opening to allow said at least one communication conduit to pass through said aperture and said shroud, and said at least two portions of said shroud having mating clamp ears in contact with each other, said mating clamp ears comprising two sets of mating clamp ears positioned on opposed sides of said central opening, with first securement members to tighten said mating clamp ears against each other to provide a seal at an end of said shroud remote from said surface;
said shroud has a platform base receiving second securement members to secure said shroud to said surface; and
said platform base includes a full cylindrical portion formed on one of said at least two portions of said shroud, and a second portion smaller than said full cylindrical portion formed on another of said at least two portions of said shroud.

2. The system as set forth in claim 1, wherein said surface is a firewall for use in a gas turbine engine.

3. The system as set forth in claim 1, wherein said at least one communication conduit includes at least one electric wire.

4. The system as set forth in claim 3, wherein a grounding element is received within at least one of said shroud portions, and said grounding element for electrically grounding said at least one communication conduit.

5. The system as set forth in claim 1, wherein said at least one communication conduit includes at least a fluid tube.

6. The system as set forth in claim 1, wherein there are two mating halves of said shroud which are secured together.

7. The system as set forth in claim 1, wherein a fiberglass tape is wrapped around said at least one communication conduit at the location of said mating clamp ears.

8. The system as set forth in claim 1, wherein said shroud includes a plurality of openings at said end, and there being outer ends to said at least two portions of said shroud with said mating clamp ears at said outer ends, and said plurality of openings including at least one outer opening positioned adjacent each of said mating clamp ears at said outer ends, and at least one intermediate opening intermediate said at least one outer opening, with clamp surfaces provided between said at least one outer opening and said at least one intermediate opening, and there being third securement members tightening said clamp surfaces to also provide a seal at said intermediate opening.

9. A gas turbine engine comprising:
a compressor, a combustor, a turbine, and a firewall separating a first chamber housing at least one of said compressor, combustor and turbine from a chamber housing a controller for the gas turbine engine, said firewall having an aperture for allowing passage of at least one communication conduit; and
a shroud positioned on said firewall at said aperture, said shroud having at least two portions defining a central opening to allow said at least one communication conduit to pass through said aperture and said shroud, and said at least two portions of said shroud having mating clamp ears in contact with each other, said mating clamp ears comprising two sets of mating clamp ears positioned on opposed sides of said central opening, including first securement members to tighten said clamp ears against each other to provide a seal at an end of said shroud remote from said firewall;
said shroud has a platform base receiving second securement members to secure said shroud to said firewall; and
said platform base includes a full cylindrical portion formed on one of said two portions of said shroud, and a second portion smaller than said full cylindrical portion formed on another of said at least two portions of said shroud.

10. The engine as set forth in claim 9, wherein there are two mating halves of said shroud which are secured together.

11. The engine as set forth in claim 9, wherein a fiberglass tape is wrapped around said at least one communication conduit at the location of said mating clamp ears.

12. The engine as set forth in claim 9, wherein said at least one communication conduit is an electric wire, and a grounding element is received within at least one of said at least two portions of said shroud, and said grounding element for electrically grounding said electric wire.

13. The engine as set forth in claim 9, wherein said shroud includes a plurality of openings at said end, and there being outer ends to said at least two portions of said shroud with said mating clamp ears at said outer ends, and said plurality of openings including at least one outer opening positioned adjacent each of said mating clamp ears at each of said outer ends, and at least one intermediate opening intermediate said at least one outer opening, with clamp surfaces provided between said at least one outer opening and said at least one intermediate opening, and there being third securement members tightening said clamp surfaces to also provide a seal at said intermediate opening.

\* \* \* \* \*